Patented Dec. 15, 1953

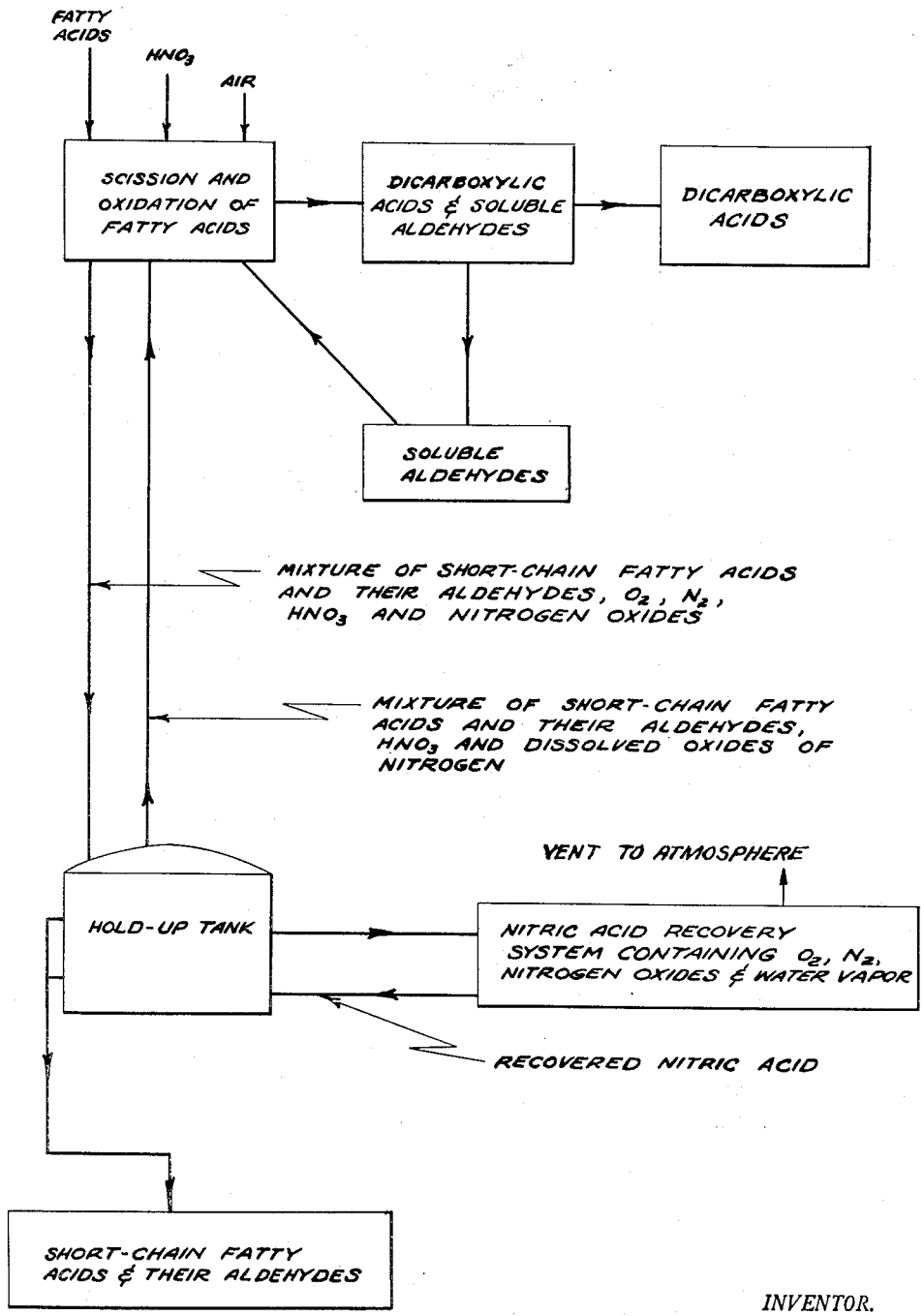

2,662,908

UNITED STATES PATENT OFFICE 2,662,908

OXIDATION OF FATTY ACIDS

Roger L. Logan, Markham, Ill., assignor to The C. P. Hall Company of Illinois, Chicago, Ill., a corporation of Ohio Continuation of application Serial No. 57,370, October 29, 1948. This application March 30, 1951, Serial No. 231,298

2 Claims. (Cl. 260—413)

This invention relates to the separate recovery of monocarboxylic acids of short chain length formed in the oxidation of fatty acids and the production of dicarboxylic acids.

The nature of the oxidation depends upon the material treated. Oleic acid and other unsaturated acids are split at the double bond and each part of the original chain is oxidized to produce a dicarboxylic acid. Saturated monocarboxylic acids may be converted to dicarboxylic acids without scission.

The process is preferably carried out at elevated temperature as a two-phase reaction. The fatty acid forms the oil phase. The water phase dissolves the dicarboxylic acid as formed, and the dicarboxylic acid eventually is recovered from the water phase. It is advantageous to employ fugitive reagents such as nitric acid, air, ozone, nitrogen oxides, hydrogen peroxides, etc., which can be removed by heating.

The generally used oxidation catalysts such as compounds of the polyvalent elements, e. g. derivatives of vanadium, manganese, mercury, osmium, etc, may be used as catalysts, but in general are to be avoided as they complicate the recovery of the dicarboxylic acids, particularly where the process is carried out as a continuous operation. Such catalysts as may be filtered off from the hot aqueous reaction product before separation of any of the dicarboxylic acid may be used.

The dicarboxylic - acid product generally includes a mixture of dicarboxylic acids, including at least one dicarboxylic acid of low molecular weight. Some oxide of carbon and water will also be formed. The higher molecular weight dicarboxylic acids having an odd number of carbon atoms are more easily broken down into shorter-chain dicarboxylic acids than those having an even number of carbon atoms. By controlling the conditions of the reaction the ratio of acids in the product may be varied. In general, higher temperatures produce a higher percentage of the lower molecular weight acids such as succinic acid, and lower temperatures produce a greater proportion of the longer-chain dicarboxylic acids in which the less-stable odd-carbon chain compounds are present in higher percentages.

The preferred oxidizing agent is air. The use of air as an oxidizing agent is claimed in the copending application of George R. Murphy, Serial No. 169,065 filed June 19, 1950. With air, some oxygen carrier or other catalyst must be used to effect the reaction. A preferred reaction is oxidation with air using nitrogen oxides as the carrier. Although some oxygen may be supplied by the nitrogen oxides or nitric acid resulting from solution of these oxides in water, air is the cheapest source and the conditions of the reaction are preferably so regulated that as much as possible of the oxygen used in the reaction is derived from the air. As much as 70 or 80 per cent or more of the oxygen may be derived from the air.

The invention relates more particularly to the oxidative scission of a fatty acid containing a single olefinic group such as, for example, oleic acid. The scission product of oleic acid is a mixture of dicarboxylic acids being chiefly suberic, azelaic, and succinic acids with minor portions of adipic, sebacic and pimelic acids. By severe oxidation the yield of the higher dicarboxylic acids such as azelaic is decreased while the yield of lower dicarboxylic acids including succinic is increased. In many chemical reactions requiring a dicarboxylic acid the mixture of dicarboxylic acids may be used without separation and with little or no purification. The invention includes two different oxidative scission products of oleic acid, both of which are composed substantially entirely of dicarboxylic acids: one contains at least 20 or 30 per cent or more of both suberic and azelaic acids; the other contains up to 50 or as much as 60 per cent or more of succinic acid. Products of different acid content may be produced by varying the conditions of the reaction.

This preferred reaction is illustrated in a general way by the following equations:

$$CH_3.(CH_2)_7.CH:CH.(CH_2)_7.COOH + 3.5O_2 \rightarrow 2HOOC.(CH_2)_7.COOH + H_2O$$

$$HOOC.(CH_2)_7.COOH + 7.5O_2 \rightarrow HOOC.(CH_2)_2.COOH + 5CO_2 + 5H_2O$$

Nitric acid is converted to nitrous acid during the oxidation reaction. It is known that the olefinic bond in oleic acid may shift under the influence of nitrous acid and also that there are present in all commercial fatty acids polyethylenic compounds such as linoleic and linolenic acids which have double bonds in several positions in the carbon chain. The chain may rupture at any one of these double bonds or at more than one of the double bonds. Also these double bonds may shift. The above equations are therefore illustrative of only the main reactions.

Although the above equations relate to the treatment of fatty acids and production of dicarboxylic acids therefrom, aldehydes including semi-aldehydes and di-aldehydes produced as intermediates in the reaction and separately recovered, may be returned and converted to dicarboxylic acids.

Although the invention relates particularly to the oxidative scission of oleic acid, it includes as of almost equal importance the oxidative scission of mixed unsaturated acids derived from fish-liver oils, etc. Since the reaction is not limited to oxidative scission, the monocarboxylic acids present in such mixtures may be converted to dicarboxylic acids simultaneously with the scission and conversion of the unsaturated acids. Other monocarboxylic fatty acids that may be converted to dicarboxylic acids according to the invention include the mixed fatty acids derived from linseed oil, soybean oil, castor oil, coconut oil, lard oil, cottonseed oil, peanut oil, tall oil, sunflower-seed oil, rapeseed oil, mustard-seed oil, safflowerseed oil, as well as mixtures of such acids, etc.

Thus, the invention relates to the production of dicarboxylic acids from olefinic, di-olefinic and tri-olefinic acids such, for example, as oleic acid, linoleic acid, linolenic acid, clupanodonic acid, iso-oleic acid, the eleostearic acids, erucic acid, the hydroxy olefinic acids such as ricinoleic acid, the dihydroxy acids, such as dihydroxy stearic acid, and saturated fatty acids such, for example, as stearic acid, palmitic acid, etc.

The various raw materials contain fatty acids of different chain lengths. Although the invention relates more particularly to the treatment of fatty acids of a chain length of twelve to twenty-four carbon atoms, the invention includes the treatment of shorter chain compounds down to acids containing no more than four or six carbon atoms, and more generally includes the treatment of fatty acids having hydrocarbon or hydroxylated chains of four to twenty-four carbon atoms.

Thus the process of this invention provides a desirable means of producing from different starting materials dicarboxylic acids which contain four to ten carbon atoms. These include, for example, succinic acid, adipic acid, pimelic acid, suberic acid, azelaic acid and sebacic acid. The conditions of the reaction can be controlled to produce more or less of the various acids.

These acids are relatively soluble in hot water and dissolve in the water phase of the reaction mixture as formed. They are relatively insoluble in cold water, and separate on cooling. Azelaic acid and suberic acid, which have great commercial value and can be produced from oleic acid, etc., are soluble in hot water and soluble only to the extent of about 0.2 per cent and 0.1 per cent, respectively, in cold water. The water of the reaction mixture contains nitric acid which ordinarily will slightly increase the solubility of the dicarboxylic acids. The fatty acids used as the raw material are insoluble in both hot and cold water and form the oil layer in the reactor, hence they do not contaminate the product obtained from the water phase. Aldehydes such as suberic dialdehyde (octandial) and semi-aldehydes seem generally soluble in both hot and cold water and are recovered to some extent from the water phase with the dicarboxylic acids. They may be removed from the crude reaction product by washing and returned to the reactor where they are converted to dicarboxylic acids.

The preferred oxidizing agent is air, and it is used with nitric acid, using nitrogen oxides as an oxygen carrier. Nitrogen oxides resulting from the use of nitric acid, as herein contemplated, are readily reconverted by air oxidation to higher oxides and may be reused.

In carrying out the oxidation, a two per cent solution of nitric acid has been employed successfully with air under a pressure of 40 to 45 pounds per square inch. The acid consumption was high and gave an abnormally high percentage of aldehydes. The aldehydes were not particularly objectionable because they could be oxidized with air to dicarboxylic acid. An 8 to 15 per cent solution of nitric acid will normally give the best results. Nitric acid of up to 30 per cent strength may be used, but with such a high percentage of nitric acid, low air pressures ranging from atmospheric to not more than about five pounds are recommended because using higher pressures the reaction may become violent. Using nitric acid of such high concentration the dicarboxylic acid product has been slightly nitrated. The concentrations mentioned may be used in carrying out the reaction at the boiling temperatures of the aqueous reaction mixtures at the respective pressures. At low temperatures the reaction is slower, and higher concentrations may be employed. Air may be bubbled through the reaction mixture at room temperature and atmospheric pressure but the reaction is too slow for commercial operations. The reaction is preferably carried out at the boiling point of the weak nitric acid in order to keep the acid content substantially constant during the reaction. Boiling causes the nitric acid present in the aqueous phase to be agitated up through the oil layer. As the reaction occurs at the interface, this hastens the reaction. Agitation may be provided.

In the oxidation process the nitric acid is converted to nitrogen oxides. These oxides are being constantly reconverted to nitric acid in the reactor and elsewhere in the equipment wherever the oxides are intermixed with oxygen in the presence of water. Nitrogen oxides which escape from the reactor with air, etc. are washed with condensate in any suitable recovery system and are recovered as nitric acid which is reused. Thus the nitrogen oxides serve as a carrier for the oxidation reaction and the reaction is preferably controlled to keep the consumption of nitric acid at a minimum.

The presence of water in the weak nitric acid inhibits nitration which occurs when concentrated nitric acid is used and the reaction is carried out without nitration and the oil phase is converted to dicarboxylic acids without producing a nitrogen-containing residue. The ratio of dilute nitric acid of a concentration of 8 to 15 per cent, to fatty acid being oxidized will advantageously be about four to six parts of dilute nitric acid to one part of fatty acid by weight. In the preferred operation of this invention, with maximum use of air as the oxidizing agent, the nitric acid consumption is far below any prior-art process for nitric-acid oxidation of fatty acids to dicarboxylic acids. In a number of small-scale operations using oleic acid, with relatively inefficient recovery of the nitrogen oxides, less than 0.5 pound of anhydrous $HNO_3$ were required per pound of mixed dicarboxylic acids produced. Smaller consumption is expected on efficient, large-scale operations. From these figures it is obvious that a high percentage of the oxygen required in the process is supplied by the air.

If the reaction is carried out at atmospheric pressure and air is bubbled through the reaction mixture, slow conversion is obtained. At room temperature some conversion will occur but the reaction will be slow. Commercially, a temperature of 80° C. or higher will be employed. The pressure may be atmospheric but commercially there will be used a pressure of at least five pounds per sq. in. gauge, and pressures between 30 to 50 pounds per square inch gauge or thereabouts, and up to 100 pounds per sq. in. gauge or higher may be employed.

Instead of producing the carrier from nitric acid, recovering nitrogen oxides from the reaction mixture, regenerating nitric acid therefrom and recirculating this acid through the reacting mixture, the carrier may be obtained by starting with nitrogen dioxide or a mixture of nitrogen oxides. For example, nitrogen dioxide produced by oxidation of ammonia may be bubbled up through the reacting mixture, and the resulting nitrogen oxides converted to nitric acid and reused in the process. Such use of nitrogen oxides prevents undue dilution of the reaction mixture by water. Nitric acid or the oxidizing nitrogen oxides may be used with other oxidizing gas than air, such as, for example, oxygen, oxygen-enriched air, or ozone, etc.; hydrogen peroxide and other peroxides, etc. may be used. From the standpoint of cost, the use of air and nitric acid or nitrogen dioxide is preferred.

The drawing illustrates the method by a flow sheet. The fatty acids, nitric acid and air are introduced into a reactor which is preferably jacketed and operated under the desired pressure. Any suitable reaction chamber such as an autoclave or tower may be used. The operation may be a batch operation or continuous. A mixture of short-chain fatty acids, principally pelargonic acid and short-chain aldehydes soluble in these acids but insoluble in water are carried over from the reactor to a hold-up tank by water vapor generated in the reactor. This vapor contains nitric acid, nitrogen oxides, and nitrogen and oxygen resulting from addition of air to the reactor. These are suitably cooled and collected in the hold-up tank from which nitrogen oxides, nitrogen, oxygen and water are carried to the nitric acid recovery system. The nitric acid recovered is preferably returned to the hold-up tank. The waste gases are vented to the atmosphere. The short-chain fatty acids and aldehydes are recovered by decantation, as illustrated.

The dicarboxylic acids and soluble aldehydes (which probably include semi-aldehydes and dialdehydes) are dissolved in the water phase of the reaction mixture and are withdrawn from the reactor, crystallized or otherwise suitably recovered. Aldehydes formed as intermediates and removed from the reactor in the water phase may be separated from the acids by the recrystallization of the acids from water or other solvent, or in any other suitable manner. The longer-chain dicarboxylic acids such as azelaic, suberic and adipic acids may be separated from such acids as succinic acid by utilizing their difference in solubility in water or other solvents. Any suitable means for oxidizing, recovering and reusing nitrogen oxides, recovery and purification of dicarboxylic acids, purification of monocarboxylic acids and their aldehydes, and reuse or purification of soluble aldehydes, etc. may be employed.

The following examples illustrate the invention. The first two examples were carried out under comparable conditions except that they were run at different temperatures (which necessitated different pressures). The results of these two runs are recorded in the following table to illustrate that by control of the temperature and pressure more or less azelaic acid is converted into succinic acid. The yields are not recorded because the examples refer to parts of continuous runs and only estimates could be obtained as the composition of the residual oil in the reactor before and after the taking of samples and the use and reuse of aldehydes, etc., involves complications in any calculations. From other experiments it is known that the yields of dicarboxylic acids produced, per pound of red oil charged are 105 per cent to 115 per cent or thereabouts, depending upon the composition of the dicarboxylic acid product.

TABLE

*Production of dicarboxylic acids from commercial single-distilled red oil under different operating conditions*

| | Example 1 | Example 2 |
|---|---|---|
| Conditions: | | |
| Temperature [1] _____°C____ | 142 | 122 |
| Pressure (p. s. i.-gauge)_____ | 40 | 15 |
| Nitric Acid Concentration___percent__ | 14 | 14 |
| Products: | | |
| Azelaic Acid_____do____ | 13 | 36 |
| Suberic Acid_____do____ | 30 | 31 |
| Succinic Acid_____do____ | 57 | 33 |

[1] In the table the temperatures given are those of steam at the stated pressures.

EXAMPLE 1

A charge of 3.32 pounds of residual oil and 2.08 pounds of water-soluble aldehyde were reacted in a seven-gallon reactor with about five times their weight of 14 per cent nitric acid under 37 to 40 pounds p. s. i. gauge pressure at the boiling point of the nitric acid solution at these pressures. The pressure was maintained with an excess of air which was fed into the top of the reactor. There was also added continuously nitric acid (38° Baumé) to replace whatever nitric acid had been reduced to an oxide of nitrogen which could not be recovered. Over a period of time there was also added in small increments 23.6 pounds of single-distilled red oil. During the reaction there was continuously vaporized water and some short-chain acid, such as pelargonic acid and its aldehyde.

The added nitric acid kept the boiling point constant and consequently the nitric-acid concentration was maintained at the desired figure.

Periodically the boiling was stopped and the phases allowed to separate into two layers, and portions of the water layer were removed and the total solids recovered therefrom as crude dicarboxylic acids. After purification the acid content was calculated from acid number and melting point, to be that recorded in the foregoing table.

EXAMPLE 2

A charge of 1.9 pounds of residual oil was reacted in the seven-gallon reactor with approximately four times its weight of 14 per cent nitric acid under 15 pounds p. s. i. gauge which was maintained with air. The reaction was held at the boiling point of the weak nitric acid solution at this pressure. There was continuously added in small increments 5.1 pounds of single-distilled red oil. The boiling was stopped at intervals and the two phases allowed to separate into two layers and dicarboxylic acids were recovered. The recovered dicarboxylic acids were purified and analyzed by determination of acid number and melting point and found to have the acid content given in the foregoing table.

EXAMPLE 3

Five parts of crude fatty acids from fish-liver oil and 25 parts of 9 per cent nitric acid were maintained at the boiling point for eight hours in the same equipment, employing 15 pounds per square inch gauge pressure and passing an excess of air through the top of the autoclave. At the end of this period there was dissolved in the nitric solution 2.06 parts of solid matter. The nitric acid solution was withdrawn, cooled, crystallized and concentrated and then further crystallized in the manner described for oleic acid. There were obtained 1.55 parts of dicarboxylic acid. The material remaining in aqueous solution was composed mostly of intermediate aldehydes and was recirculated by adding it to the next batch of material. By further reacting the remaining residual oil was further oxidized with 10 per cent nitric acid at the boiling point with 15 pounds pressure using excess air until all the fatty matter had been oxidized. Upon successive crystallizations and concentrations there were obtained 3.08 parts of dicarboxylic acids. This gave a product of 4.63 parts. Not all of the mother liquors and recovered concentrates were worked up into dicarboxylic acids.

The oxidative scission of the acids from fish-liver oil on conversion to dicarboxylic acids under the same pressure gives a product of about the same analysis as the oxidative-scission product of oleic acid. The fish-liver oil contained about ten per cent of saturated fatty acids such as stearic and palmitic acids, and these were completely converted to dicarboxylic acids, as indicated.

The examples are illustrative. Using air and weak nitric acid some or all of the air may be bubbled through the reaction mixture. Other acids may be treated and other oxidizing agents employed. The lower molecular weight acids such as succinic acid, which are more water soluble than the longer chain dicarboxylic acids, may be separately recovered in any desirable manner as by fractional crystallization, etc. from the filtrate before the filtrate is reused. Recrystallization may be carried out in any desired number of steps. Any suitable means for recovering the dicarboxylic acids may be used. Any suitable means for recovering the oxides of nitrogen may be employed. The air may be preheated or cooled. It may be brought into contact with the reaction mass by bubbling therethrough or in any desired manner. Control means, heating and cooling means, etc. may be utilized as desired.

In the specification and claims the term "fatty acid" is used broadly to include unsaturated, saturated, and substituted (e. g. hydroxylated) fatty acids.

At various places the specification refers to reaction pressures, which are used to indicate the temperature at which the reaction mixture boils. Such temperatures are above the boiling point of water, under pressure, because of the presence of nitric acid, dicarboxylic acids, aldehydes and the like composing the reaction mixture.

What I claim is:

1. The process of producing monocarboxylic acid, which comprises oxidizing fatty acid containing 4 to 24 carbon atoms with air in the presence of nitric acid of 8 to 30 per cent concentration at an elevated temperature and thereby producing fatty acid of shorter chain length than the original fatty acid together with dicarboxylic acid and volatilizing said acid of shorter chain length from the reaction mixture during the reaction, condensing it and collecting it separately from the reacting mass.

2. The process of oxidative scission of oleic acid which comprises oxidizing the same with air in the presence of aqueous nitric acid of 8 to 30 per cent concentration thereby producing monocarboxylic acid of shorter chain length than the oleic acid together with dicarboxylic acid by oxidation of the oleic acid, and volatilizing said acid of shorter chain length from the reaction mixture during the reaction, condensing the acid of shorter chain length, and collecting it separately from the reacting mass.

ROGER L. LOGAN.

References Cited in the file of this patent

UNITED STATES PATENTS

| Number | Name | Date |
|---|---|---|
| 1,520,885 | Rankin | Dec. 30, 1924 |
| 2,191,786 | Aronow | Feb. 27, 1940 |
| 2,193,562 | McAllister | Mar. 12, 1940 |
| 2,203,680 | Ellingboe | June 11, 1940 |
| 2,292,950 | Loder et al. | Aug. 11, 1942 |
| 2,298,387 | Kenyon et al. | Oct. 13, 1942 |
| 2,365,290 | Price et al. | Dec. 19, 1944 |
| 2,420,938 | Doumani et al. | May 20, 1947 |
| 2,436,269 | Scott | Feb. 17, 1948 |
| 2,450,858 | Fitzpatrick et al. | Oct. 5, 1948 |
| 2,486,454 | Zellner | Nov. 1, 1949 |
| 2,486,455 | Zellner | Nov. 1, 1949 |
| 2,533,620 | Polly | Dec. 12, 1950 |

FOREIGN PATENTS

| Number | Country | Date |
|---|---|---|
| 500,746 | Great Britain | Feb. 15, 1939 |

OTHER REFERENCES

Laurent, Annales de Chem. et de phys. (2) vol. 66, pp. 157–72 (1836).

Bromeis, Liebigs Ann., vol. 35, pp. 96–105 (1841).

Carette, Compt. rend., vol. 102, p. 693 (1886).

Tilley, Liebigs Ann., vol. 39, p. 166 (1840–1844).

Sacc, Liebigs Ann., vol. 51, pp. 221–229 (1844).

Wirz, Liebigs Ann., vol. 104, p. 271 (1857).

Arppe, Liebigs Ann., vol. 120, p. 288 (1861).

Brighton, Chem. Abstracts, vol. 12, p. 98 (1917).

Day et al., J. Chem. Soc. (London) vol. 117, p. 641 (1920).

Arppe, Beilstein (Handbuch, 4th ed.) vol. 2, p. 692 (1920).

Kiliani, Ber. Deut. Chem., vol. 54, p. 463 (1921).

Carmichael, J. Chem. soc. (London), vol. 121, pp. 2546–2547 (1922).

Derx, Rec. Trav. Chim. des Pays-Bas, vol. 41, p. 338 (1922).

Gatterman, "Practical Methods of Organic Chemistry," (MacMillan by Schoben et al.) pp. 1–13 (1923).